Figure 12:
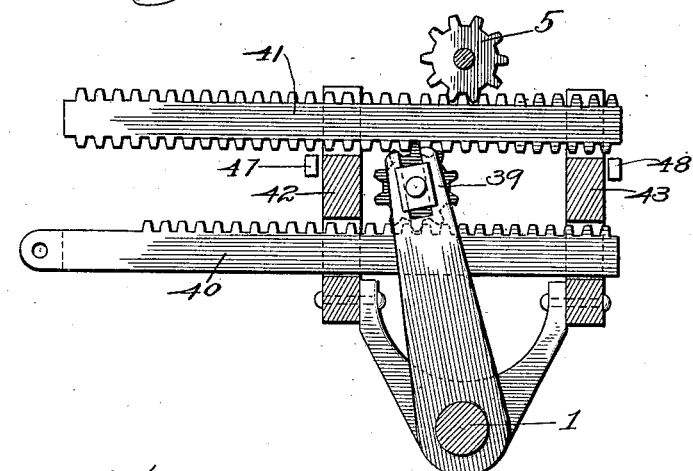

No. 757,511. PATENTED APR. 19, 1904.
D. W. SHIEK.
MECHANICAL MOVEMENT.
APPLICATION FILED JUNE 22, 1903.
NO MODEL. 5 SHEETS—SHEET 1.
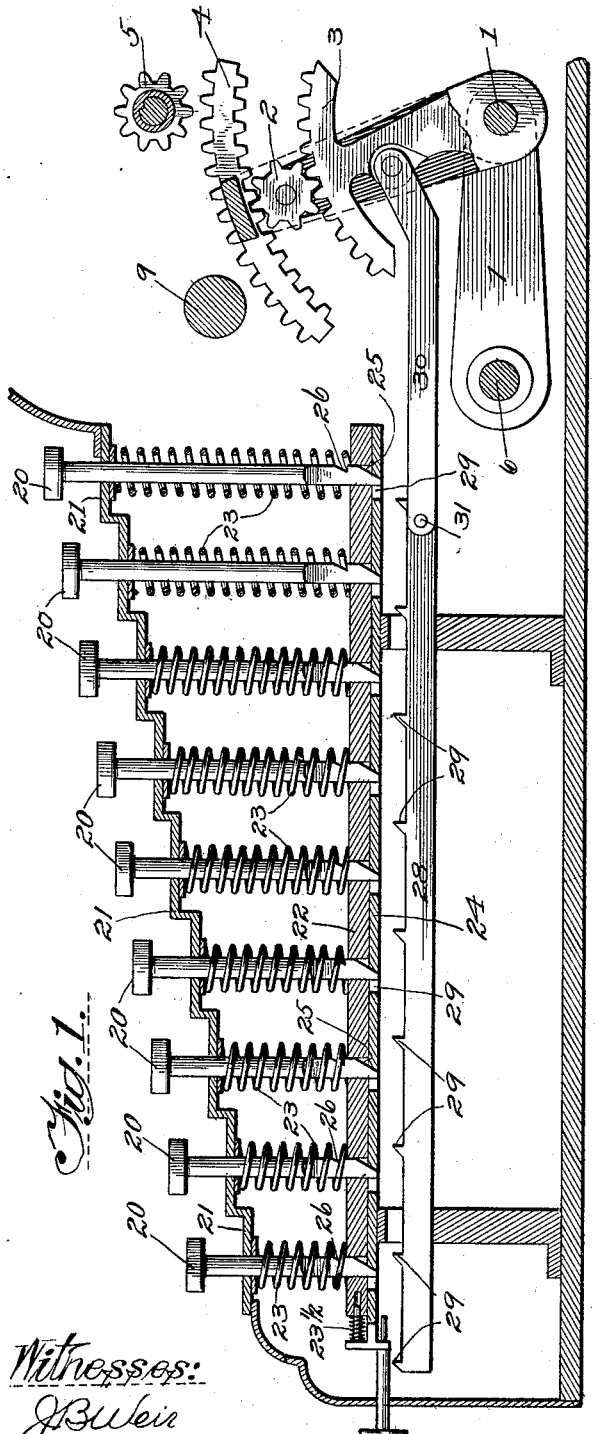
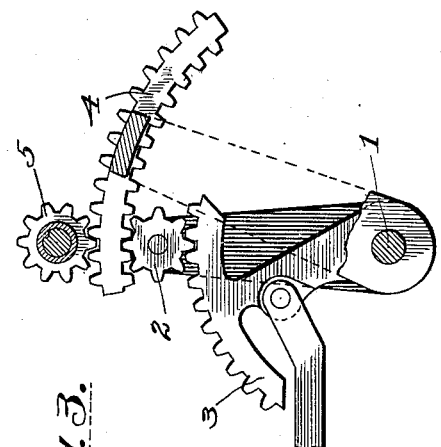
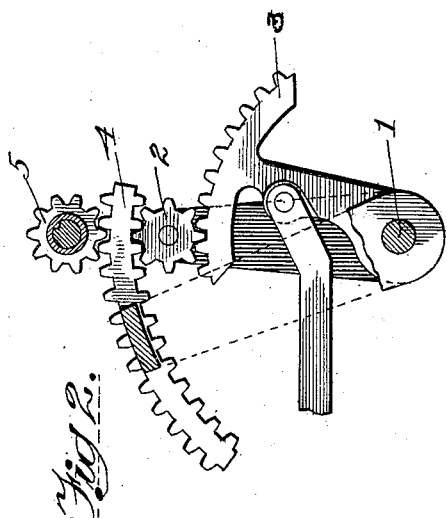

No. 757,511. PATENTED APR. 19, 1904.
D. W. SHIEK.
MECHANICAL MOVEMENT.
APPLICATION FILED JUNE 22, 1903.
NO MODEL. 5 SHEETS—SHEET 2.
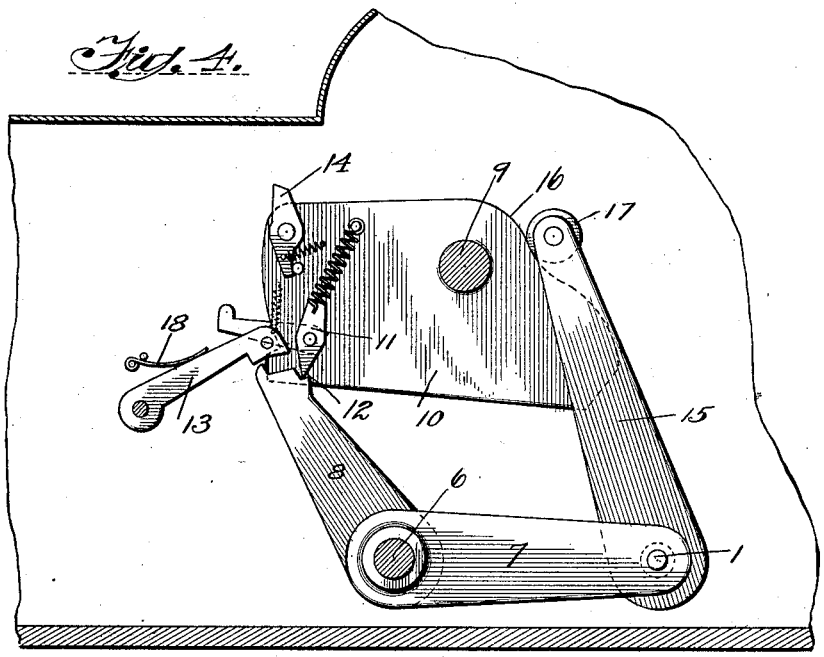
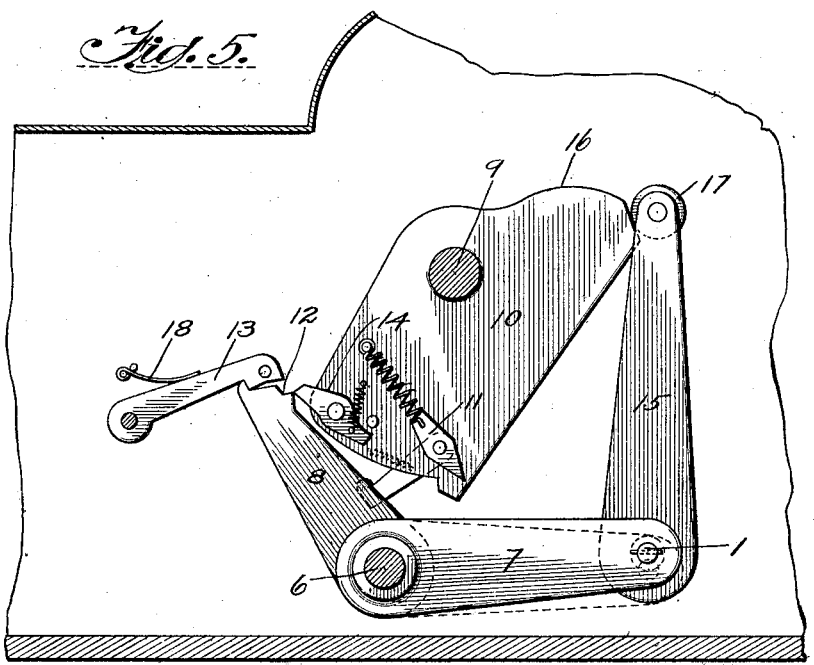
Witnesses:
J B Weir
Robert H. Weir
Inventor:
Daniel W. Shiek
By John W. Hill Atty.

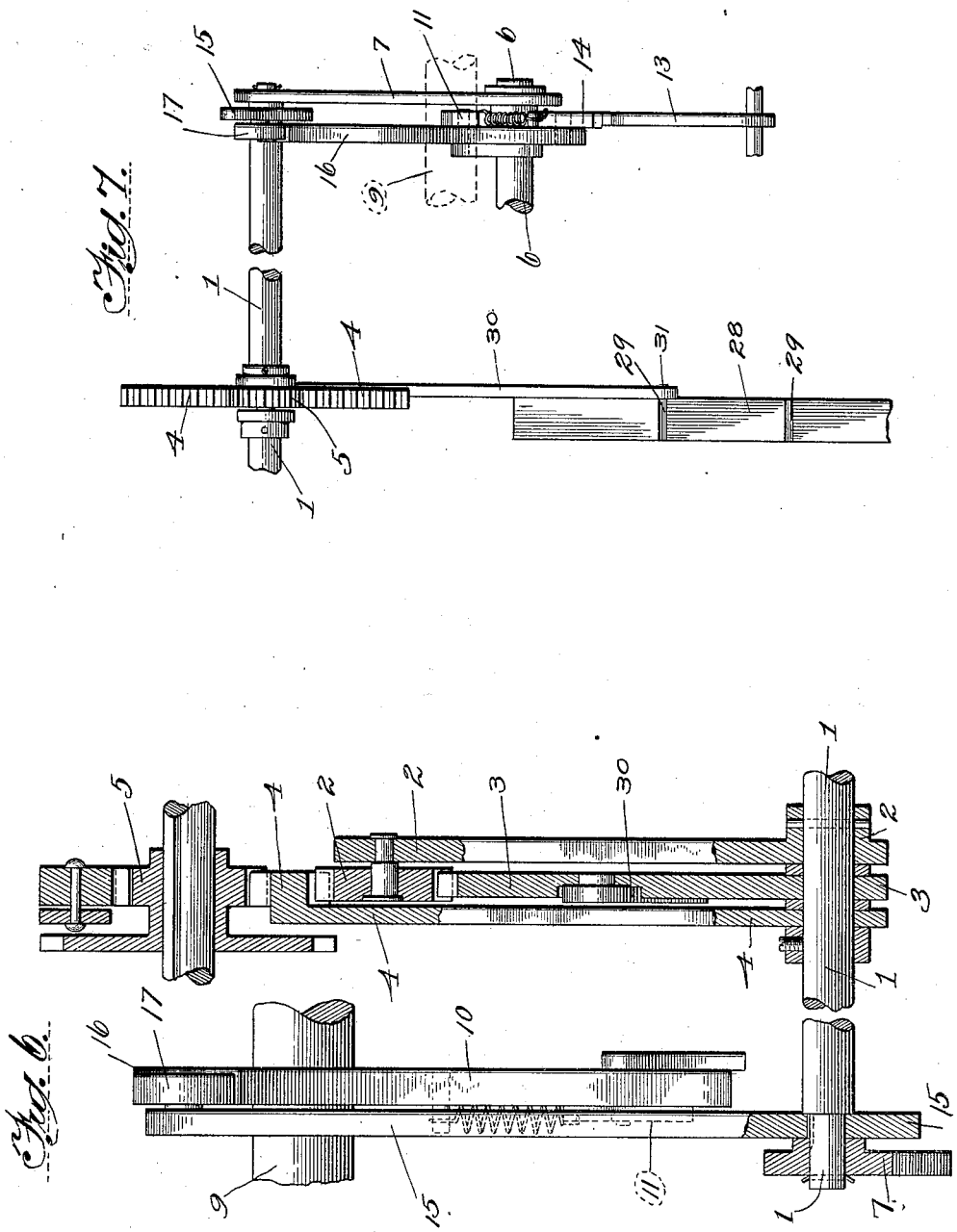

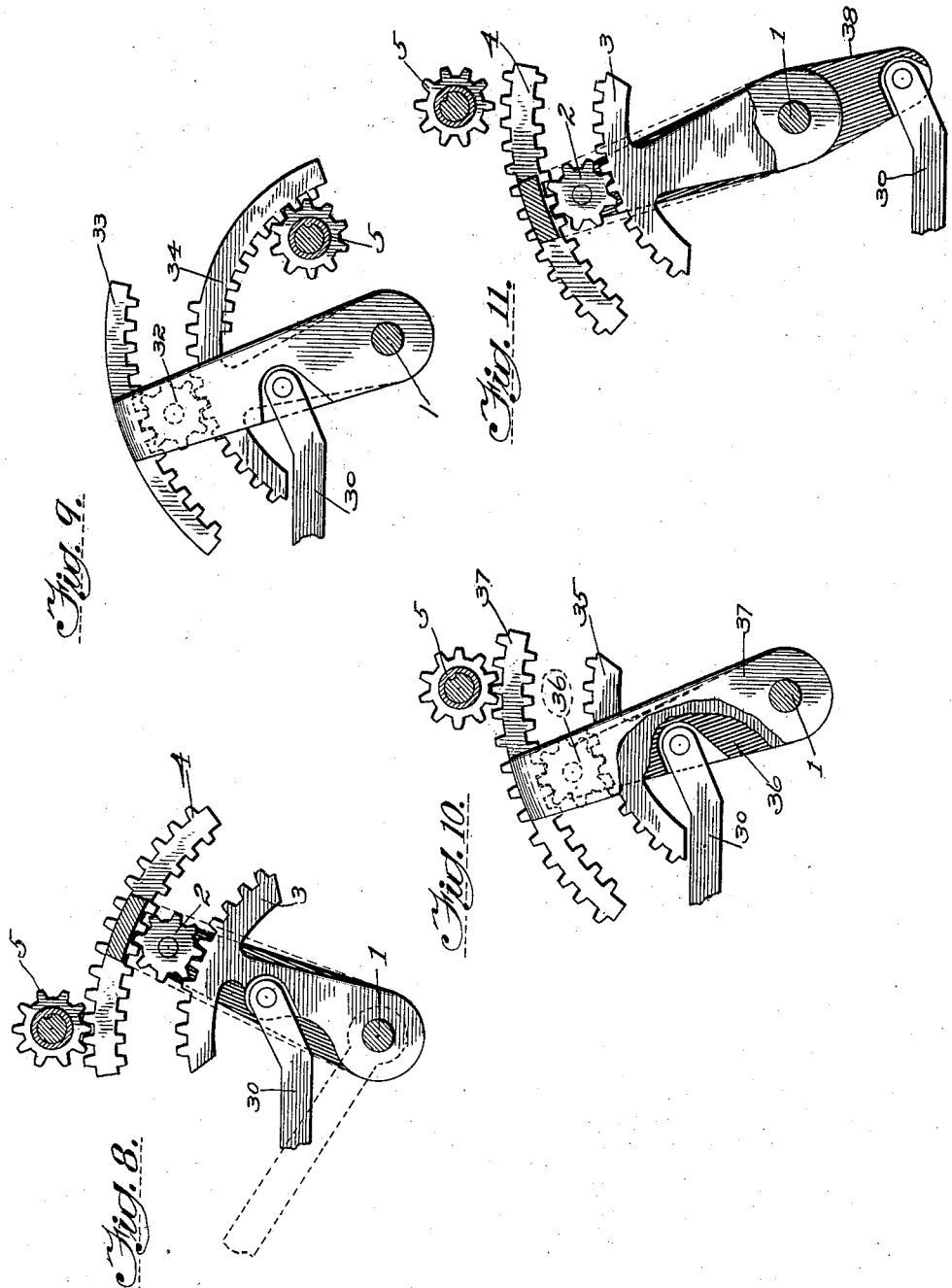

No. 757,511. PATENTED APR. 19, 1904.
D. W. SHIEK.
MECHANICAL MOVEMENT.
APPLICATION FILED JUNE 22, 1903.
NO MODEL. 5 SHEETS—SHEET 5.

No. 757,511.                                              Patented April 19, 1904.

UNITED STATES PATENT OFFICE.

DANIEL W. SHIEK, OF CHICAGO, ILLINOIS, ASSIGNOR TO ADDISON BYBEE, OF MILFORD, UTAH.

MECHANICAL MOVEMENT.

SPECIFICATION forming part of Letters Patent No. 757,511, dated April 19, 1904.

Original application filed December 10, 1901, Serial No. 85,383. Divided and this application filed June 22, 1903. Serial No. 162,577. (No model.)

*To all whom it may concern:*

Be it known that I, DANIEL W. SHIEK, a citizen of the United States of America, residing at Chicago, in the county of Cook and State of Illinois, have invented a certain new and Improved Mechanical Movement, of which the following is a description.

This invention is shown and described in an application for Letters Patent for improvement in calculating-machines, filed by me on December 10, 1901, Serial No. 85,383, of which this is a division.

The object of my invention is to produce a simple and effective mechanical movement adapted to convert the uniform movement or travel of a driving member into the variable movement or travel of a transmitting member, as may be desired.

To this end it consists in the novel construction, arrangement, and combination of parts herein shown and described, and more particularly pointed out in the claims.

In the drawings, wherein like reference characters indicate like or corresponding parts, Figure 1 is a partial sectional view of a calculating-machine, showing a simple form of my invention and one means for controlling its operation. Figs. 2 and 3 show the positions of the various parts at different periods during operation. Fig. 4 is a side elevation of a part of one form of operating means. Fig. 5 is the same, showing a different position of the parts. Fig. 6 is a partial rear elevation of the form shown in the preceding figures, partly in section, to more clearly show the construction. Fig. 7 is a partial top plan view of the same, taken from a position in front; and Figs. 8 to 13, inclusive, are modifications of my invention.

Broadly speaking, my invention, as shown in the various modified forms, comprises the combination and coöperation of what may for the purposes of description be termed a "driving" member, a "limiting" member, and a "transmitting" member, each so engaging the others that the combined operation of all three is necessary and essential to secure the desired results. It also contemplates suitable means for imparting movement to the driving member, as well as suitable means for regulating and controlling the movement or travel of the limiting member, and hence of the transmitting member.

In the preferred form shown in the drawings, 1 is a shaft on which are mounted an arm or lever carrying a driving member 2, a second arm or lever carrying a limiting member 3, and a third arm or lever carrying a transmitting member 4. Either of the members 2, 3, and 4 may by proper arrangement be made to perform either of the functions above referred to, as will be more fully pointed out hereinafter. Also any suitable means may be employed to impart motion to the driving member and to limit or measure the travel of the limiting member, while the operation of the transmitting member may be employed for any suitable purpose preferred.

As shown in Figs. 1, 2, and 3, my movement is shown as applied to a computing-machine, the transmitting member 4 being adapted to impart motion to a cog-wheel or pinion 5 operating indicating mechanism. (Not shown.) For this purpose I prefer to so arrange the several parts that when in their normal positions the transmitting member 4 is out of engagement with the pinion 5, as shown in Fig. 1, while the initial movement of the operating crank or lever will serve to engage them, as herein explained. Any preferred means may be employed for this purpose. As shown, a rock-shaft 6 extends transversely across the machine and has secured thereto on one end the bell-crank lever 7 8, Figs. 4 and 5, and on the other end a rearwardly-extending lever corresponding to the part 7 of the bell-crank. (Not shown.) The shaft 1 is supported by said rearwardly-extending arm and the part 7, so that as the bell-crank lever is operated the shaft 1 and the parts mounted thereon are lifted, engaging the transmitting member 4 with the pinion 5. Any suitable means may be employed to operate the bell-crank lever 7·8. As shown, a transverse shaft 9 has fixed thereto a cam-plate 10, carrying a dog 11, adapted to engage a notch 12 on the arm 8.

A latch 13 is arranged to engage the end of the arm 8 as the latter is depressed and maintained in such position until released therefrom, a spring 18 insuring such action. A second trip 14 serves to engage the latch as the movement of the cam is reversed and lift the same, releasing the arm 8 therefrom and permitting the shaft 1 and the parts carried thereby to fall to their normal positions. The shaft 1 has firmly secured thereto a lever 15, having its end extended in a position to contact with and be oscillated by the cam-face 16 of the cam 10. An antifriction-roller 17 may be mounted upon said lever 15. This action rocks the shaft 1 and oscillates the driving member which is secured thereto, the limiting member and the transmitting member being loosely mounted on said shaft for a purpose hereinafter made plain. A spring or equivalent means may be employed to cause the end of the lever 15 to follow the cam-face 16 on the reverse movement, and thus return the parts to their normal positions.

In my before-mentioned application a spring is shown as attached to one of the arms or fixed members on shaft 1 and to a stationary part of the machine for accomplishing the above-stated purpose; but any obvious means can be employed.

Any preferred means may be employed to limit the movement or travel of the limiting member. In the simple mechanism shown for this purpose one bank of a series of vertically-movable keys 20 20 is shown arranged in the well-known manner common on calculating and similar machines. The keys in each bank may be marked to indicate the numerals, as usual. 21 is the cover-plate, and 22 the face-plate. The keys are positioned in suitable apertures formed in the plate 21 and 22 and are normally held in a retracted position by suitable springs 23 or equivalent means. 24 is a longitudinally-movable bar arranged to engage with and retain any key in a depressed position. A spring 23½, arranged between the upturned end of the bar 23 and the plate 22, serves to resiliently maintain the bar 23 normally in the position shown in Fig. 1. The lower end of each key is constructed to loosely engage the bar 24 and be retained in position thereby. In the form shown the lower end of each key is provided with an inclined face 25 and a shouldered notch 26. The point or reduced end of the key is positioned in an aperture 27 or its equivalent for that purpose formed in the bar 24, so that upon depressing a key the inclined face 25, contacting with the wall of the aperture 27, forcibly moves the bar longitudinally sufficiently to permit the end of the key to pass through and the bar to engage the notch 26, the spring 23½ insuring such engagement. The key is thus retained in such position until purposely released. Forcibly moving the bar 24 longitudinally by pressing upon the outer end thereof will release the key.

A longitudinally-movable bar 28 is positioned beneath and preferably in line with the section of keys and is provided with stops 29, corresponding in number with the keys in the section. The stops are regularly arranged, so that the distance the bar 28 may travel depends upon the particular key set, the distance varying for each key. A bar or strap 30 is connected to the bar 28, as at 31, having its face end pivotally connected to the limiting member 3. In the preferred form the connection at 31 is also pivotal, permitting the free end of the bar sufficient vertical play to accommodate the oscillating movement of the member 3.

As thus described, it will be seen that the operation is as follows: Upon setting a key 20 the key is engaged by the bar 24 and maintained in a position with its depending end in the line of travel of one of the stops 29 as the bar 28 is longitudinally moved. In the initial movement of rocking the shaft 9 and its cam 10, which is accomplished by the usual operating-lever secured near its end, (not shown,) the dog 14 on the cam 10 engages the notch 12 near the end of the arm 8, depressing the lever to engage the latch 13, which retains the lever in said position until released by the reverse movement, Figs. 4 and 5. This action lifts the part 7 and its companion part on the opposite end of the shaft 6, (not shown,) lifting the shaft 1, bringing the cog-segment of the transmitting member 4 into meshing engagement with the pinion 5. Upon further depressing the operating-lever and rocking the cam 10 the cam-face 16 of the cam forces the free end of the lever or arm 15 rearward, rotating the shaft 1 and swinging the free end of the arm carrying the driving member 2, which arm is also fixed to the shaft 1, and the member 2 rearward. The transmitting member 4 being temporarily retained in position in engagement with the pinion 5 is prevented from moving by the pinion and its associated parts, (not shown,) and upon the rearward movement of the driving member 2, meshing therewith, the limiting member 3, also meshing therewith, is driven rearward a distance limited by the engagement of the stop 29 on the bar 28 with the end of the depressed key. At this instant the limiting member 3 stops and is firmly held in such position, causing the continual rearward movement of the driving member 2 to drive the transmitting member 4 rearward a distance regulated by the limit of movement remaining to the operating-lever and the corresponding movement of the driving member 2. It will be noted that the pinion 5 is positively governed by the movement of the transmitting member 4 and that the latter is positively governed by the movement of the limiting member 3. The limiting member 3 in its turn is controlled by the longitudinal movement of the bar 28, which depends upon the distance between the particular contacting stop 29 and the set-key. It will also be noted that said distance is gradually and regularly varied to vary the distance the connected parts may move, and hence the rotation of the pinion 5. On the reverse movement of the mechanism the initial movement causes the trip 14 to engage and lift the latch 13, releasing the bell-crank 8 7 therefrom and permitting the shaft 1 and the parts carried thereby to drop, disengaging the transmitting member 4 from the pinion 5, and the various parts return to their normal positions. The several connecting parts are so constructed that if the movement of the limiting member 3 is unrestricted—for example, if no key be set—the operation of the mechanism will simply cause the oscillation of the limiting member 3 without disturbing the transmitting member 4 and pinion 5.

Fig. 2 shows the position of the parts at the end of the operation when the transmitting member 4 and the pinion 5 are given but a slight movement, the limiting member 3 being shown near the limit of its movement. Fig. 3 shows the position of the parts under the contrary conditions.

It will be seen that as thus described the pinion 5 will be constantly driven in the same direction. Such operation may be desirable, for example, as in machines similar to those shown in my pending application. Under other circumstances it may not be necessary or even desirable that it shall so operate. Under such circumstances the transmitting member 4 may be in constant mesh with the pinion, as shown in Figs. 8 and 9. Obviously the bell-crank-lever construction or other means for lifting the parts to engage the transmitting member with the pinion 5 will be dispensed with and the operating-lever may be secured directly to the rock-shaft 1, as shown in dotted lines in Fig. 8. The operation of the essential parts will be the same as described, except that the pinion 5 is rotated the distance measured by the operation of the transmitting member 4 and on the reverse movement is returned to its original position.

Fig. 9 shows a modification with a change of position of the parts. As here shown the part 32 constitutes the driving member, the segment 33 the limiting member, and the double cog-rack 34 the transmitting member engaging the pinion 5.

In the form shown in Fig. 10 the part 35 constitutes the driving member, the part 36 the limiting member, and the part 37 the transmitting member.

Fig. 11 shows a form similar to that shown in Figs. 1, 2, and 3, with the exception that the limiting member 2 is extended beyond the center of oscillation, (the shaft 1,) as at 38, and the bar 30 is secured to such extension.

Fig. 12 shows a slightly different form in which the part 39 constitutes the driving member, 40 the limiting member, and 41 the transmitting member engaging the pinion 5. The latter two consist of straight bars or cog-racks maintained in suitable guideways in the boxes 42 43.

Figure 13:
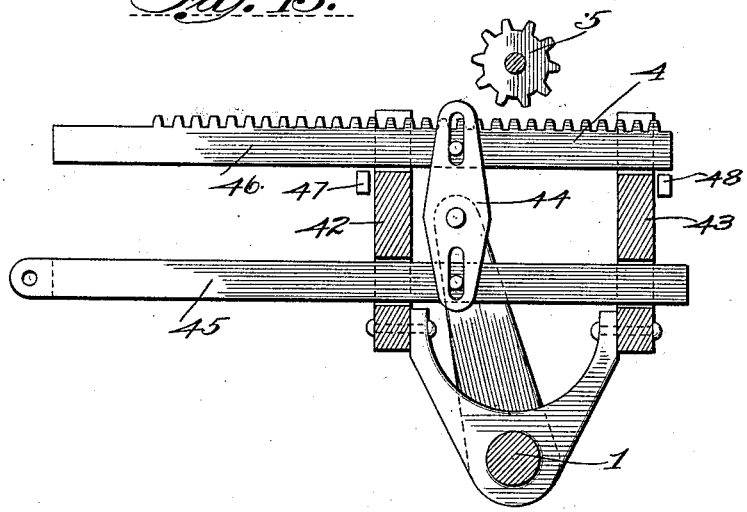

Fig. 13 shows another modification in which the driving-pinion 39 of the last figure is replaced by a pivoted lever 44, pivotally secured near its center to the supporting-arm. The limiting member 45 is a plain bar, while the transmitting-bar 46 is adapted to engage the pinion 5, as before. The operation is obvious. The side guides 47 48 serve to retain the guides 42 43 in proper vertical position.

Having thus described my invention, what I claim as new, and desire to secure by Letters Patent, is—

1. Transmission mechanism, comprising the combination of a driving member, a limiting member, and a transmitting member, the three engaging one another and the former two cooperating to regulate the travel of the latter, means for imparting movement to the driving member, and means for variably regulating the travel of the limiting member, whereby the transmitting member is governed by the travel of the limiting member, substantially as described.

2. Transmitting mechanism, comprising the combination of a driving member pivotally supported near its center, and means for forcing said member forward and backward, with two complemental movable members engaging said driving member on opposite sides of its pivotal support, and means for limiting the movement of one of said movable members at will, whereby the movement of one of said movable members is governed by the travel of the other, substantially as described.

3. Transmitting mechanism, comprising a driving-pinion and means for rotating said pinion, in combination with a limiting member and a transmitting member meshing with said pinion on opposite sides of its center, and means for limiting the travel of said limiting member, whereby the movement of the transmitting member is governed by the travel of the limiting member, substantially as described.

4. Transmitting mechanism, comprising a freely-rotating driving-pinion, and means for forcing said pinion forward and backward, in combination with two complemental cog-rack members meshing with said pinion on opposite sides of its center, whereby the movement of one of the cog-rack members is governed by the travel of the other, substantially as described.

5. Transmission mechanism, comprising a pinion supported upon an oscillating lever, and means for operating said lever, in combination with two complemental segmental cog-racks meshing with said pinion on opposite sides of its center, and means for limiting the movement of one of said cog-racks, whereby the movement of one of said cog-racks is controlled by the travel of the other, substantially as described.

6. Transmission mechanism, comprising a pinion pivotally supported upon an oscillating lever, and means for oscillating said lever, in combination with two oscillating levers or arms each provided with a segmental cog-rack meshing with said pinion on opposite sides of its center, and means whereby the movement of one of the cog-racks will be limited by the travel of the other cog-rack, substantially as described.

In testimony whereof I have hereunto signed my name in the presence of two subscribing witnesses.

DANIEL W. SHIEK.

In presence of—
K. M. IMBODEN,
CHARLES I. COBB.